Oct. 30, 1951     L. F. EXLEY     2,573,251
SOLE MOLD SELECTOR AND CONVEYER

Filed Sept. 27, 1950     6 Sheets-Sheet 1

Inventor
Leo F. Exley
By
Alexander Dowell
ATTORNEYS

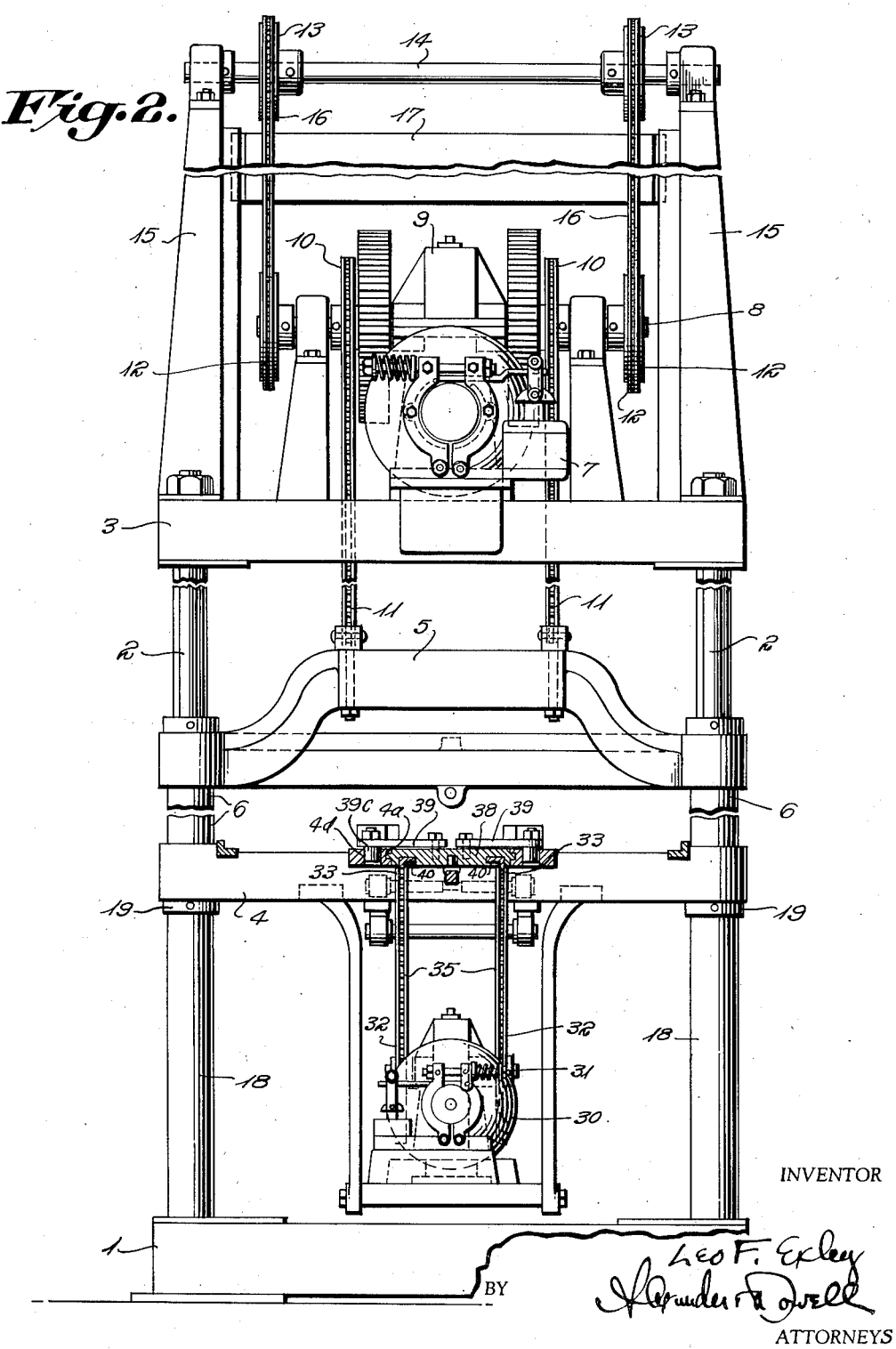

Oct. 30, 1951 L. F. EXLEY 2,573,251
SOLE MOLD SELECTOR AND CONVEYER
Filed Sept. 27, 1950 6 Sheets-Sheet 3
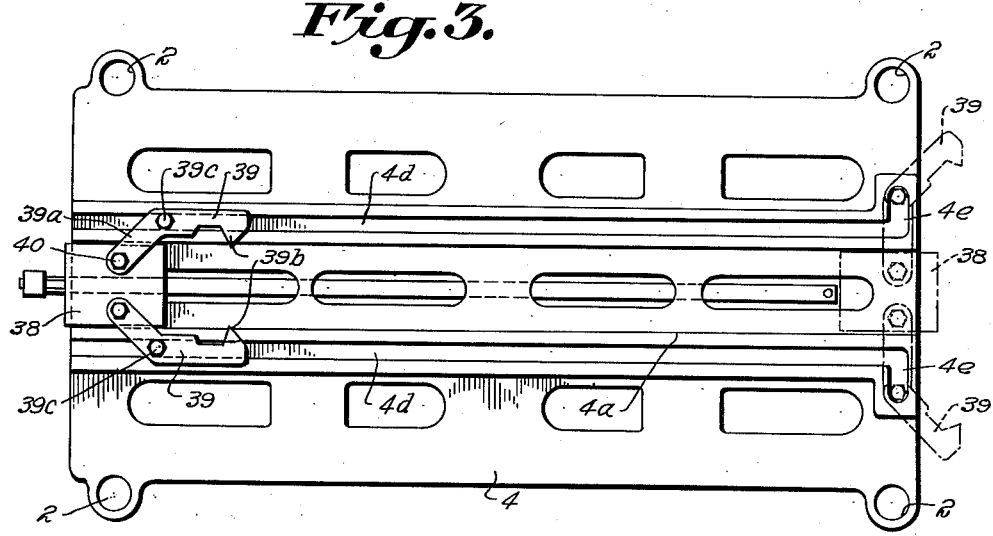
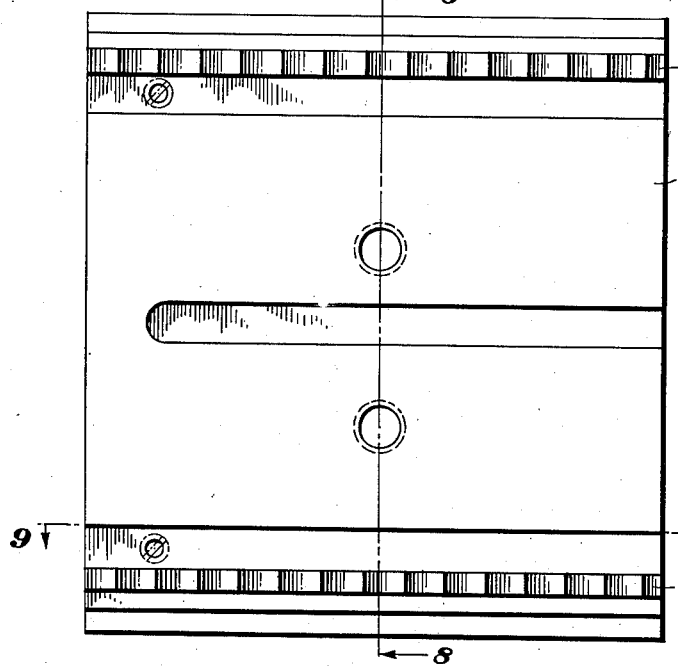
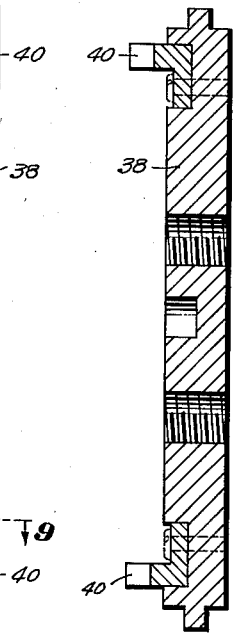
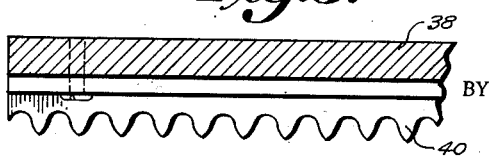
INVENTOR
Leo F. Exley
BY
ATTORNEYS

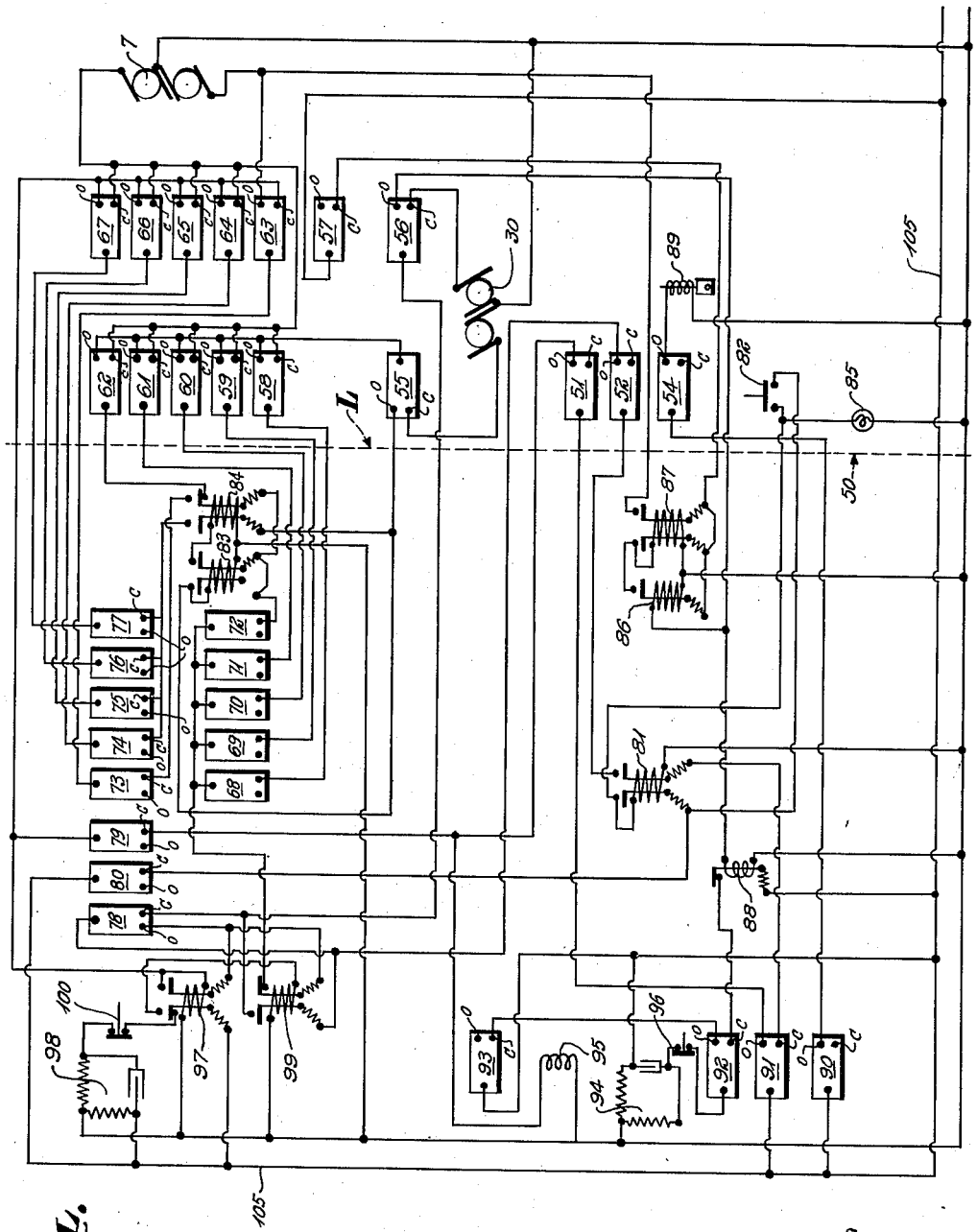

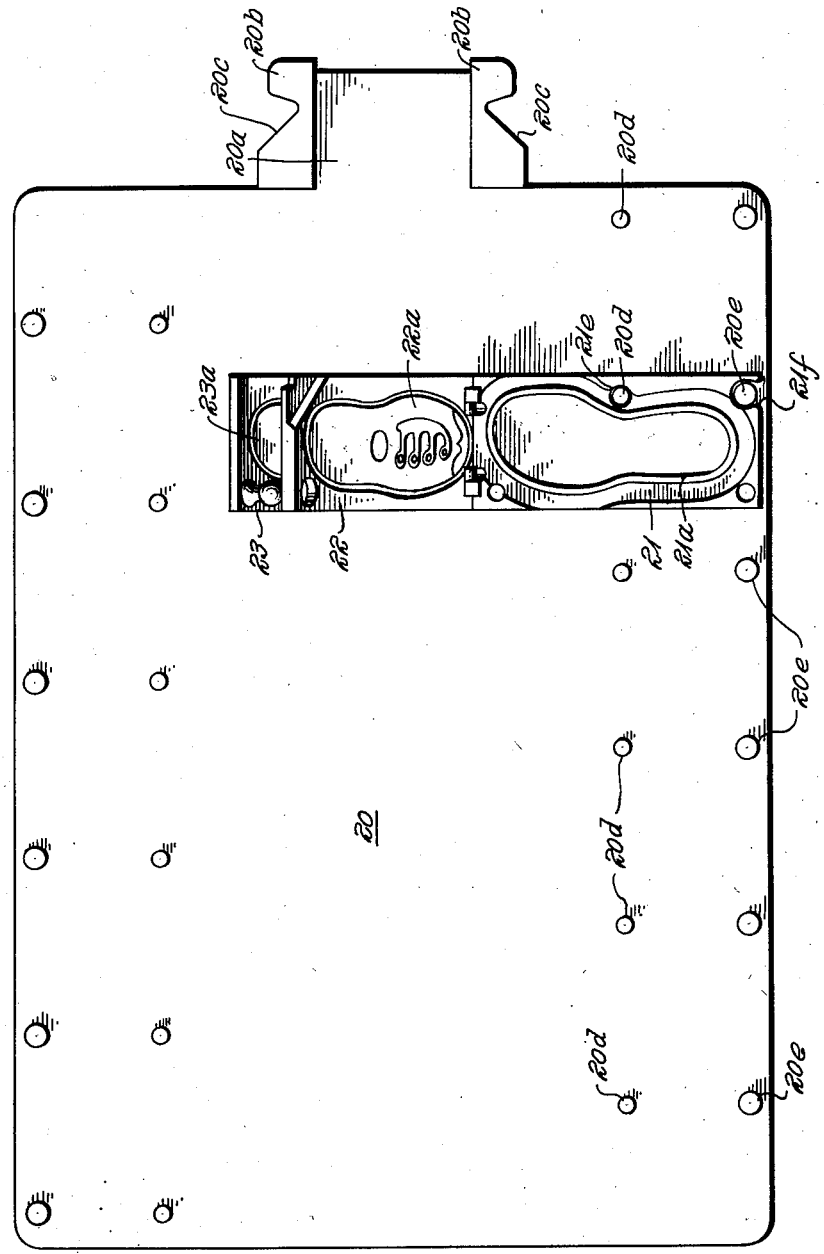

Patented Oct. 30, 1951

2,573,251

UNITED STATES PATENT OFFICE 2,573,251

SOLE MOLD SELECTOR AND CONVEYER

Leo F. Exley, Johnson City, N. Y., assignor to Endicott Johnson Corporation, Endicott, N. Y., a corporation of New York Application September 27, 1950, Serial No. 187,036

20 Claims. (Cl. 18—1)

This invention is a novel sole mould selector and conveyor particularly adapted for use in the manufacture of composition soles, generally termed "rubber soles" for footwear, the same operating in conjunction with a standard press used to produce rubber soles, i. e., a vulcanizing press, and sole moulds.

One object of my invention is to provide a sole mould selector and conveyor adapted to select and withdraw from the vulcanizing press a multiplicity of moulds; to convey the moulds to the operator; to present same at the proper working level; and then after the operator has performed the steps of removing and refilling the moulds to take the moulds to the proper level and insert same into the vulcanizing press, my inventin continuing to repeat the above operation at the will and under control of the operator.

The regular and standard procedure and apparatus used in the manufacture of rubber soles is briefly outlined as follows. Rubber soles are ordinarily produced by placing blanks of uncured rubber in the cavities of suitable moulds, then inserting the moulds between the platents of a vulcanizing press, and then submitting the moulds to heat and pressure for a predetermined length of time. Sole moulds in general use usually consist of two slabs of metal, generally steel. In one plate there are recessed cavities of the size and shape and design of the soles required, this plate being known as the "cavity plate." Hinged or doweled to the cavity plate, is a "cover plate" which, as its name implies, constitutes a means for covering the cavities. Such moulds as above described, have a plurality of cavities, and are usually made the full size of the press platens, between guide posts.

Another type of mould, and the one I prefer is a three-plate hinged mould whose outside dimensions are such as will just accommodate one sole. In this construction two cavities are provided, one in the bottom plate and one in the center plate. When the mould is closed the bottom of the center plate acts as the cover for the bottom cavity, and the third and remaining plate forms the cover for the cavity in the center plate, dowel pins secured in the top plate maintaining the three plates in proper superimposed register. A number of moulds, as above described, are assembled on a mould platen approximately the size of the press platen.

The standard hydraulically operated vulcanizing press consists of a number of steam heated platens horizontally arranged between a fixed head piece and a movable bottom bed piece, the platens being guided in their up-and-down movements by corner guide posts. The movable bottom bed piece is attached to the upper end of a hydraulic ram which is free to move upward and downward in its cylinder. When pressure (water or other fluid) is admitted to the cylinder, the ram is forced upwardly, which moves the bottom bed and superimposed platens upwardly and compresses the platens between the bottom bed and fixed head piece, in which condition the press is said to be "closed." The platens are so arranged that when pressure is released from the cylinder, the ram and bottom bed are lowered to bottom position, and the platens are suspended from the upper head in such manner that a uniform spacing is maintained between the head and bottom bed, between the platens themselves, and between the top platen and head piece. In this position the press is said to be "open."

In practice, pieces of uncured or raw rubber stock of approximately the shape of a sole are placed in the cavities of the mould, and the covers then closed over the cavities, and the moulds are inserted in one of the spaces between platens of the "open" press. When all the spaces are filled with moulds the press is "closed." Uncured or raw rubber stock is compounded with various chemicals and vulcanizing agents, so that when heat is applied a physical change takes place, the blanks within the moulds expanding, filling the entire cavities, and upon the expiration of a predetermined length of time, the press is "opened" and the moulds withdrawn and "opened," the cavities containing finished vulcanized soles, possessing elasticity and resistance to wear and abrasion.

The above described process is standard, and permits of but one important variation, that is, the length of time required to vulcanize or cure raw stock, as the kind and amount of materials used for the vulcanizing agent may be varied and so produce slower or quicker curing. In practice, the length of cure is regulated to conform with the time the press operator requires for his work in filling of moulds, closing same, inserting the moulds into the press, withdrawing the moulds, and opening and unloading the moulds.

In multiple platen presses usually employed, the bottom platen is generally disposed at a convenient working height from the floor, while the uppermost platen may be twenty inches or more higher. The moulds generally used weigh between 400 and 500 pounds, so it is obvious that there exists a considerable problem in manually handling the moulds to and from the workman, into and out of their respective places in the press; and many and various schemes have been used to solve the problem. Some manufacturers utilize power operated manually regulated elevating tables, while others use swinging shelves mounted on upright posts. This latter method, while simple and inexpensive to operate, requires the workman to work on elevated platforms and definitely slows down his operations. In all cases regardless of the method or means used pushing the mould into the press and withdrawing it from the press always has been and is now a handpower operation with all manufacturers. However, my machine is power-operated, electrically controlled, and accomplishes automatically all required movements of the mould hithertofore performed manually by the operator.

Therefore, one object of my present invention is to provide a machine so designed that the operator's work table when actuated automatically inserts a series of prepared moulds in the proper space in a press, automatically moves to the next mould, withdraws another series from the press and presents same to the operator at proper working level; and successively repeats the above cycle bringing a series of moulds to and taking same away from the operator, and disposing of same in the press in the proper order or sequence.

Another object is to provide a novel mould plate provided with the specially designed lugs to be engaged by the gripper arms for shifting the same in and out of the press.

A further object is to provide the machine with a swinging bar rest, by the use of which the operator can close simultaneously all of the center plates of the series of moulds, and in the same way all of the top plates of the moulds with a single movement of each bar rest.

A further object of the invention is to provide a machine and method wherein the workman is entirely relieved of the labor and effort of moving the heavy hot moulds, but need only manually lift the hinged pieces of the moulds, remove cured soles, reload same with uncured blanks, and close the moulds; and thus is not required to wear protective gloves as is necessary in ordinary hand operations; my method and machine thus having a greatly increased output per man and per set of moulds. Manipulating the moulds by power is much faster than is possible by hand. Inasmuch as the operator's entire time is utilized in only loading and unloading the moulds, I have shortened the length of the cure, since the moulds are out of the press and returned in shorter time; and thus heat loses from radiation while moulds are out of the press are lessened. Capital investment in presses and moulds is high, consequently the higher the output per mould in a given time, the greater the returns on an investment. In actual practice, operators using my conveyor are averaging an output of 16 to 9 as compared with operators on other presses equipped with hydraulically powered manually controlled elevating tables.

I will explain the invention with reference to the accompanying drawings, which illustrate one practical embodiment thereof to enable others to adopt and use the same; and will summarize in the claims, the novel features of construction, and novel combinations of parts, for which protection is desired.

In said drawings:

Fig. 2 is an enlarged end view of the machine.

Fig. 3 is a plan view of the work table, showing the gripper arm carriage, the grippers being shown in closed position in full lines, and in open position in dotted lines.

Fig. 4 shows a wiring diagram for the machine.

Fig. 5 is a top plan view of a mould plate showing one mould placed thereon.

Fig. 7 is a bottom plan view of the gripper arm carriage.

Fig. 8 is a section on the line 8—8, Fig. 7.

Fig. 9 is a detail section.

Figure 1:
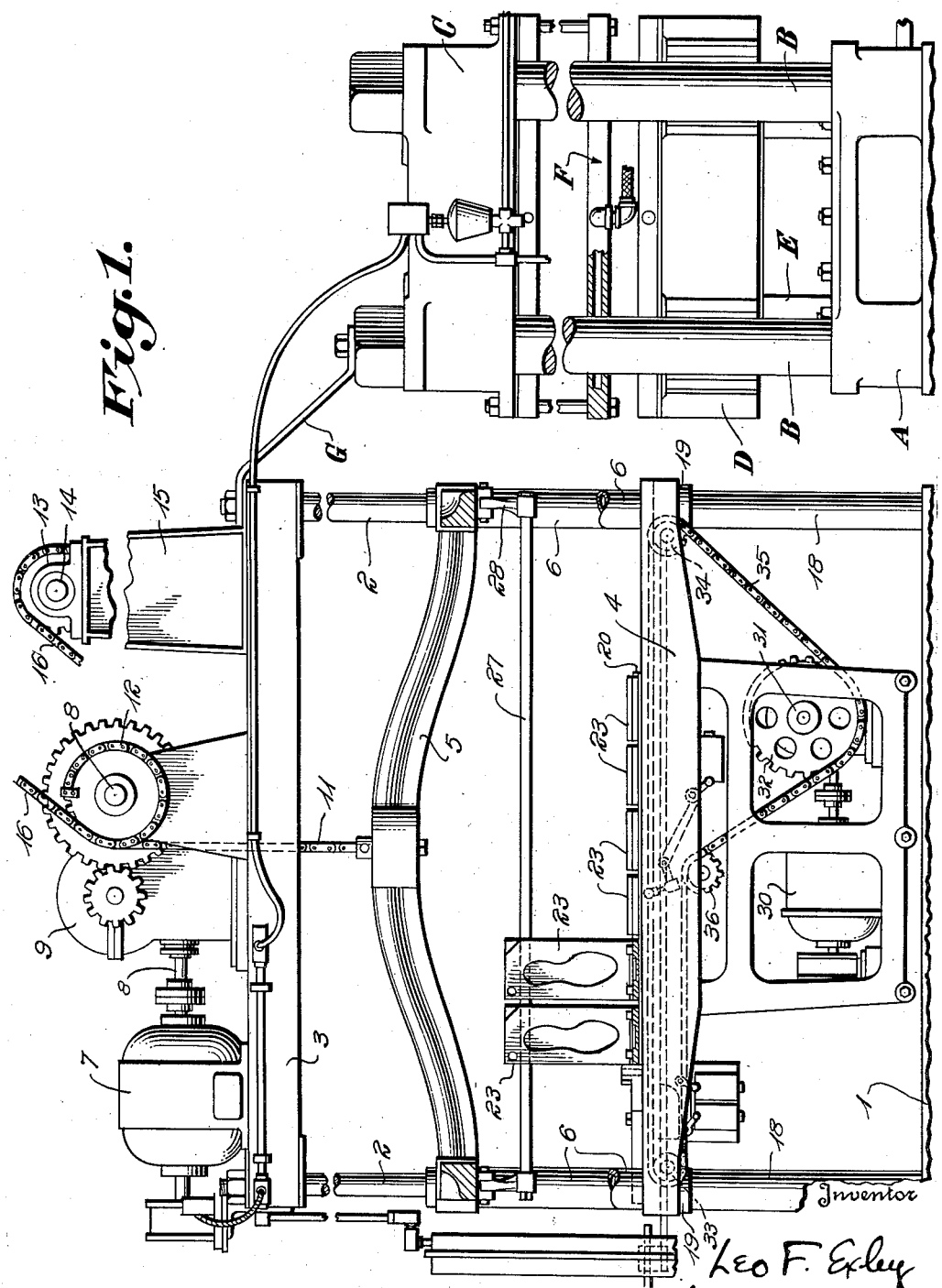
Figure 1 is a side elevation, partly in section, of my novel machine, showing same associated with a vulcanizing press, and showing several moulds on the work table of the device in open, and also in closed positions.

The vulcanizing press is of conventional form, same comprising a base A having vertical guides B thereon carrying at their upper ends a fixed head C. A movable head D is vertically movable on on the guides B and is actuated by a plunger E in the usual manner. A series of vulcanizing plates F are interposed between the heads C and D, the same being heated in the conventional manner, and being adapted to be raised against the fixed head C by the movable head D with the mould plates 20 interposed therebetween when the head D is raised, vulcanizing plates F being separated when the movable head D is lowered so that the series of vulcanizing plates F will separate fixed equal intervals apart. The particular vulcanizing press being of standard form forms no part of my present invention.

At the front of the vulcanizing press is arranged my novel selector conveyor which forms the subject matter of my present invention, the same being maintained in fixed spaced relation to the press by means of tie bands or straps G (Fig. 1) or the like.

The conveyor consists of a base 1 which is preferably mounted upon concrete or other foundation so as to be immovable, the base being substantially rectangular and of substantially the same width as the vulcanizing press.

Extending upwardly from base 1 are vertical guide posts 2 at each of the four corners thereof, the same being connected at their upper ends by a fixed head 3 in any desired manner, head 3 being disposed above the top of the vulcanizing press.

Vertically movably mounted upon the guides 2 is a work table 4, a spider casting 5 being disposed above the table 4, and connected thereto by bearing sleeves 6 which slidably engage the guide posts 2 so that the spider casting 5, work table 4 and sleeves 6 form a unit, whereby raising or lowering of spider 5 will correspondingly raise or lower work table 4. The guide posts 2 nearest the press are preferably of circular cross-section, while the two guide posts 2 at the opposite end of the conveyor are of square cross-section. The round posts 2 are engaged by cylindrical bearing sleeves 6, while the square posts are engaged by bearing sleeves 6 having openings therein which are rectangular in shape, the same being of a greater dimension than the posts in the direction of the longitudinal axis of the work table 4. This feature is provided to compensate for contraction and expansion of the work table due to heat transmitted by the heated moulds, the lateral measurement of the openings in the square bearing sleeves providing only the usual clearance consistent with established machine practice.

The means for raising and lowering work table 4, as shown in Figs. 1 and 2, consists of a motor 7 mounted upon the head 3, the motor being reversible and responding to a controlling apparatus. The motor 7 drives a counter shaft 8 through suitable conventional speed reduction gearing contained in housing 9, the counter shaft 8 carrying spaced sprockets 10 (Fig. 2). Lifting chains 11 engage sprockets 10 and have their lower ends connected to the top of spider casting 5. The counter shaft 8 also carries sprockets 12 which are aligned with sprockets 13 journaled on a shaft 14 mounted in support 15 on the top of head 3, and chains 16 run around the sprockets 12 and have their free ends connected to a counter weight 17 slidable in guides in the uprights 15 and adapted to counter balance the weight of the work table 4 with the work thereon in any vertical position of the work table. The motor 7 is automatically controlled by an electrical circuit, hereinafter described.

As shown in Figs. 1 and 2, sleeves 18 are disposed around the lower ends of guide posts 2, the same having adjustable collars 19 on their upper ends to adjust the work table 4 so that when the table is in its lowermost position the upper face thereof will be disposed flush with the upper face of the movable head D of the press when the press is open, as shown in Fig. 1, so that the mould plate on the work table can be inserted between the upper face of the movable head D and the lowermost vulcanizing plate F of the press.

According to my invention, special mould plates 20 (Fig. 5) are utilized, said plates being of rectangular shape, somewhat smaller than the area of the vulcanizing plates F of the press, so as to be removable and insertable between the plates F when the press is open.

As shown, each plate 20 is provided on one end with an extension 20a at its center, the same having thickened side edges 20b, and the sides of the thickened edges 20b are recessed as at 20c for the purpose hereinafter described, the extensions 20a extending beyond the vulcanizing plates F when the plates are assembled in the press.

The mould plates 20 are provided with spaced pairs of pins 20d and 20e respectively, as shown, which pins extend upwardly from the faces of the mould plates 20, six such pairs of lugs or pins 20d—20e being shown in Fig. 5 at each side of the plate 20, although obviously a greater or less number of pairs of pins 20d—20e might be utilized. The pins 20d—20e are utilized to maintain the moulds in proper spaced relation upon the mould plates 20. As shown, the pins 20d are cylindrical whereas the outermost pins 20e have the countersunk heads at their upper ends.

Each of the moulds preferably comprises three parts, one of which is a base 21 having a mould cavity 21a therein shaped to receive an uncured rubber blank. The second part in an intermediate mould member 22 having a complementary mould cavity 22a on its under side cooperating with the cavity 21a in the hose 21 said intermediate member 22 having a mould cavity in its upper face adapted to receive another uncured rubber blank. The third part of the mould is an upper member 23 provided with a mould cavity 23a on its under side cooperating with the mould cavity in the upper face of the intermediate member 22, the members 22—23 being pivoted at their inner ends on the base 21. The particular moulds above described form no part of my present invention; and instead of using three-part moulds obviously two-part moulds adapted to vulcanize only one rubber sole rather than a pair of rubber soles, may be utilized. The bases 21 of the moulds 22—23 are provided with holes 21e (Fig. 5) adapted to receive the pins 20d, and with slots 21f adapted to receive the headed studs 20e, thus providing means whereby the moulds by engagement with the pins 20d—20d may be prevented from shifting laterally or longitudinally on the mould plates 20.

Figure 6:
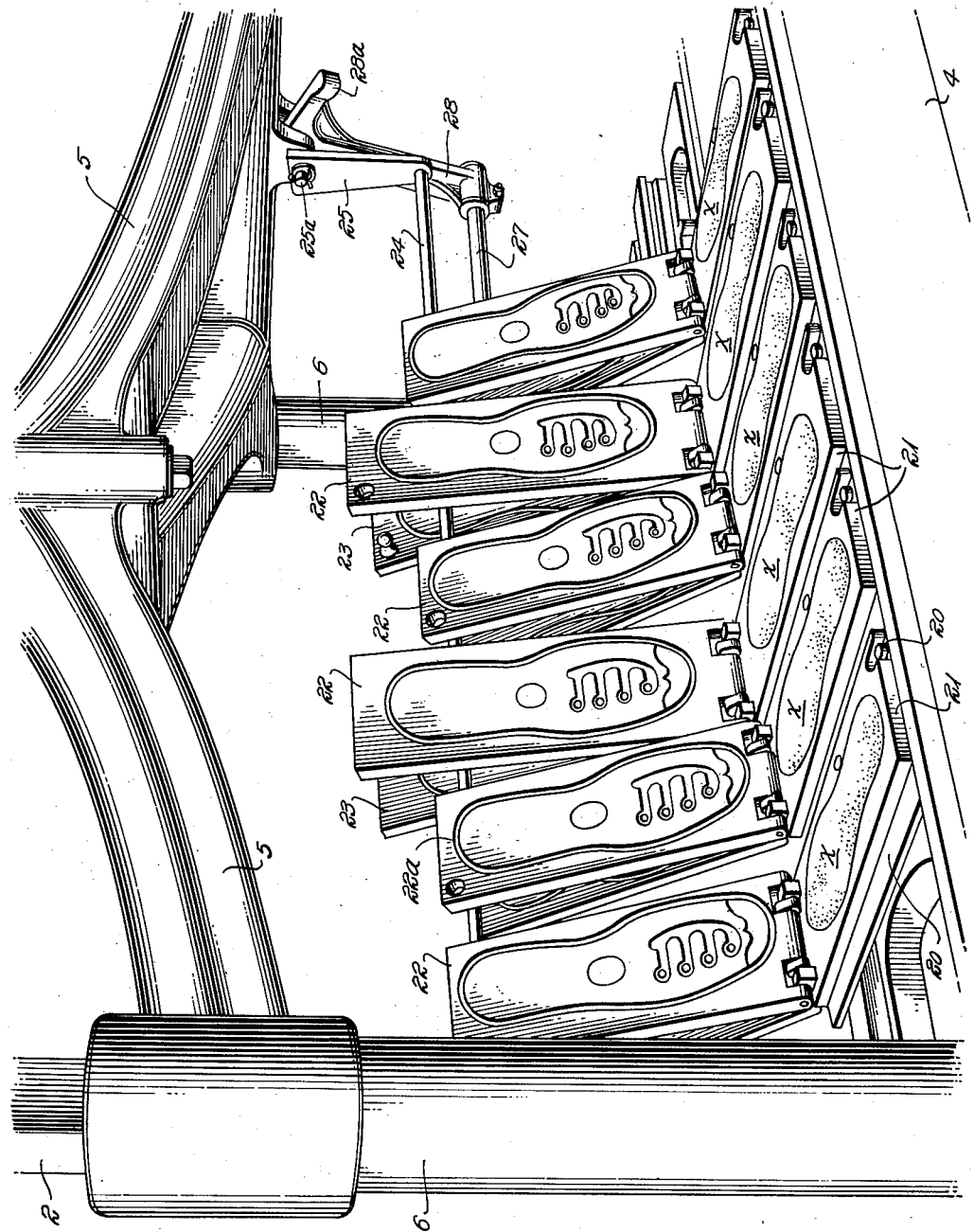
Fig. 6 is a perspective view looking at the work table and showing a series of moulds thereon in open position.

In Fig. 6 a mould plate 20 is shown carrying six moulds at one side thereof, the bases 21 being shown positioned by the pins 20d—20e on the mould plate 20 and showing uncured rubber sole blanks X in the mould cavities in the base plates 21. The intermediate plates 22 in Fig. 6 are shown in raised position to expose the mould cavities 22a, the same lying against a rod 24 carried by swingable arms 25 which are pivotally mounted as at 25a on the spider 5 at the center thereof, whereby the rod 24 may be swung laterally of the axis of work table 4 so as to simultaneously hinge the intermediate members 22 down upon the bases 21 of the moulds by a single swinging movement of bar 24. In Fig. 6, the upper members 23 of the moulds are also shown in raised position, the same engaging a swingable bar 27 which is carried in arms 28 the upper ends of which are pivoted coaxially with the pivots 25a of bar 24, said arms 28 carrying on their upper ends extensions 28a which limit the swinging movement of the arms 28, said bar 27 being manually operated to simultaneously close all of the upper members 23 of the moulds upon the intermediate members 22 after the intermediate members 22 have been closed upon the bases 21 of the moulds. The use of the swinging bars 24 and 27 thus greatly enhances the operation of closing the moulds after the uncured sole blanks X have been placed in the cavities of the moulds, since all of the members 23 or intermediate members 22 may be swung into closed position respectively by a single manipulation of the rods 24 and 27.

Means are provided for moving the mould plates 20 carrying the moulds 21, 22, 23 into and out of their respective places between the vulcanizing plates F of the press when the press is open. On the under side of work table 4 is a reversible motor 30 which drives through a speed-reducer mechanism a shaft 31 on which is mounted a pair of spaced sprockets 32.

The work table 4 is provided in its upper face with an axially disposed recess 4a (Fig. 2) extending throughout the length thereof and at each end of the table 4 are sprockets 33 and 34 respectively, over which run parallel endless chains 35 which extend upwardly within recess 4a of work table 4, the upper runs of the chains 35 extending substantially the full length of work table 4 and the lower runs of the chains underlying the spaced sprockets 32 respectively, the lengths of the chains being adjustable by means of adjustable sprockets 36 (Fig. 1) over which the chains 35 run, as shown in Fig. 1, the chains 35 thus moving simultaneously at the same speed in the same direction. Adjustability of the sprockets 36 will compensate for the chain wear and will maintain the upper runs of the chains 35 taut within the recess 4a in the upper face of the work table 4, for the purpose hereinafter set forth.

In the recess 4a of work table 4 is a gripper arm carriage 38 (Figs. 2, 3, 7 and 8), the same making a sliding fit in guide grooves, the sides of recess 4a, said gripper arm carriage 38, as shown in Fig. 3, having their rear ends 39a converging and pivoted as at 40 on the gripper arm carriage 38, the forward portions of the arms being normally disposed substantially parallel with the axis of work table 4, as shown in Fig. 3, and being provided at their outer ends with inwardly extending teeth 39b shaped to fit into the recesses 20c in the sides of the extensions 20a of the mould plates 20 (Fig. 5), when in one position of the carriage 38.

As shown in Fig. 3, parallel grooves 4d are provided in the top of work table 4 at each side of the slot 4a, which are engaged by rollers or the like on pins 39c carried by the arms 39 intermediate their ends, the slots 4d at their ends adjacent the vulcanizing press being outturned as at 4e (Fig. 3) so that when the gripper arm carriage 38 is moving toward the vulcanizing press the arms 39 will remain in the substantially parallel arrangement shown in full lines in Fig. 3. When, however, the carriage 28 approaches the end of the work table 4 adjacent the vulcanizing press, the rollers 39c will engage the outturned portions 4e of the channels 4d and the arms 39 will assume the position shown in dotted lines at the right-hand end of Fig. 3, thereby expanding the arms so as to be in position when the carriage 38 is again retracted towards the left (Fig. 3) to grip the extensions 20a of the mould plate 20 which is aligned with the end of work table 4 at that time.

As shown in Figs. 7-9, on the under side of carriage 38 are racks 40, the teeth of which are adapted to fit over the links of the upper runs of chains 35, the rack teeth being designed according to the chain formula so as to fit singly between the links of the chains.

Since the carriage 38 is held down by the gibs in the sides of the recess 4a in the upper face of work table 4, the racks 40 furnish a positive driving contact between the chains 35 and the gripper arm carriage 38, and at the same time, in the event of failure of the limit controls hereinafter described, the carriage 38 will automatically disengage the chains 35 and thus prevent damage to the related parts of the apparatus.

Fig. 4 shows the electrical circuit for controlling the various parts of the apparatus. In the diagram (Fig. 4) the right-hand side of the vertically extending dotted line 50 represents the press, while the left-hand side represents my novel machine. The operation of the machine is as follows:

While the vulcanizing press is closed, the operator removes the cured soles from the moulds 21, 22, 23 on the work table 4 and refills the moulds. After a specified curing time (of approximately 2½ minutes) the vulcanizing press opens automatically, the work table 4 rises to the proper level—say opposite #1 position, then pushes the loaded mould plate 20 into the press. The work table 4 then rises to the next station—say #2 position, withdraws the plate 20 opposite same containing the vulcanized soles, returns to the loading level, and the press then again closes and stays closed (for approximately 2½ minutes). During this time the operator empties and refills the emptied moulds and after the curing time the press again opens automatically and the press will be loaded at the #2 position and unloaded at the #3 position. The subsequent operations will be to load #3, unload #4; load #4, unload #5; load #5, and unload #1, assuming the press contains five stations.

The manner in which the above operations are performed is explained in connection with the wiring diagram (Fig. 4).

According to Fig. 4, the equipment consists of a press containing five platens F, a loading table 4, and the sequence timer. The operations of loading and curing are performed fully automatically. The only manual operations to be performed are to empty and refill the molds 21—23 and to push a certain safety push-button switch.

The soles x (Fig. 6) are cured in five subsequent steps: Four sets of molds 21—23 are in the press at one time and the fifth set is disposed on the loading table 4 to be emptied and refilled, while the other four sets of molds are being cured. At definite intervals the press opens wide, the table 4 rises to a position opposite the empty platen F and inserts a refilled set of molds thereon; then the table 4 rises to the next platen F and withdraws the cured set of molds therefrom. The press then closes while the table 4 moves down to the filling level. The operator now empties and refills the set of molds 21—23 on table 4, and then pushes the safety push-button to indicate that the set of molds on table 4 is ready to be inserted into the press the moment the press is again wide opened.

The automatic process can be understood from the wiring diagram (Fig. 4). The wiring diagram is separated into two parts by a vertical dotted line 50. The equipment at the right hand side of the dotted line 50 (Fig. 4) represents the press and loading table 4, while the equipment at the left hand side of line 50 represents the sequence timer.

The sequence timer consists of two major parts, i. e., the timer (lower left hand portion of Fig. 4), and the sequence cam shaft with motor (upper left hand portion of Fig. 4).

On the press and loading table a number of switches are mounted to fix the various stop positions of the loading table 4 for its proper operation as selected by the sequence cams. Switches 51 and 52 are installed on the press. Switch 51 is disposed in such a position that it closes contact O when the press is fully closed, while switch 52 is so disposed that it closes contact O when the press is wide open. A switch 54 is attached to the safety device which prevents the press from being closed when a mold platen 20 is also partially inserted. It is closed only when the space between the loading table 4 and the press is clear.

Switches 55 and 56 are mounted on the loading table 4 itself. Switch 55 is in its normally closed C position from the time the mold platen is fully withdrawn until it is fully inserted in the press, and is in its normally open O position from the time the mold platen is inserted in the press until it is fully withdrawn. The action of switch 56 is the reverse of the switch 55 conditions above explained.

The switches 57, 58, 59, 60, 61, 62, 63, 64, 65, 66 and 67 are installed in a panel box standing on the floor and attached to the stationary base and top platform 1 and 3 by means of metal braces. These switches fix the various positions at which the work table 4 has to stop for loading, unloading, and filling. The switch 57 fixes the filling level, while switches 58—62 inclusive fix the loading levels, and switches 63—67 inclusive fix the unloading levels. The switches 68, 69, 70, 71 and 72 are operated by the sequence cams of the sequence timer and select the loading level, while switches 73, 74, 75, 76 and 77 select the unloading level.

The switch 78 selects the movement of the loading table 4, both for loading (O position) and unloading (C position). The switch 79 positions the cam shaft for a new step. The switch 80 makes only momentary contact for the purpose of deenergizing hold-in relay 81 which must be energized again by the operator pressing safety push-button 82.

The relays 83 and 84 are necessary for the steps "load five," "unload one." The relay 81 is a safety device which prevents the table 4 from moving after the press has opened unless the operator has previously pressed safety push-button 82. The signal light 85 indicates that relay 81 is in its energized position.

The relays 86 and 87 permit the press to be closed automatically and operates timing to proceed the instant a mold platen 20 is fully withdrawn. Relay 88 is the starter relay for the timer. Electro-magnetic air valve 89 is installed on the diaphragm motor of the hydraulic valve. It closes the press when its solenoid is energized and opens the press when it is deenergized. The switch 90 of the timer goes to its C position at the end of the timing period, deenergizes valve solenoid 89 and thus opens the press. It goes to its O position thus closing the press after the withdrawn mold platen 20 over switch 56 has started the timer.

The switch 91 selects to close the circuit over switch 52 or 51. It is at the C position when the timer stands still, or in other words when the press is open and the loading table 4 has to move. The switches 92 and 93 are functional parts of the timer itself. Switch 92 is closed only when the timer is at its neutral position, ready to be started by the momentarily energized relay 88. The switch 93 is operated by the time-setting device. It operates the reset motor 94 between the end of timing to neutral position, and also from neutral to timing position. The timer motor 95 is operated by the switch 91 in its closed position, after the press is closed and the switch 51 is at open position. A push-button 96 is provided on the timer to run the reset motor 94 independently and it is not used in normal operation. The push button 96 is used only for maintenance and adjustment of the electrical apparatus.

The normally closed relay 97 operates the sequence motor 98, and the normally open relay 99 connects the closed contact of switch 78 the moment the sequence motor 98 runs. This starts the unloading motor the moment the unloading level has been reached without any delay. The push-button 100 on the sequence cam shaft drive permits the sequence motor 98 to be run manually. This push-button is not used in normal operation. It is important, however, that if required, this button 100 is used to select and withdraw any mold in any position in the press and such withdrawal is accomplished quickly without waiting for the complete cycle of operation, as when in production.

In operation, assuming that the press is closed, the timer is running, and a loading operation has been selected to load platen #1 and unload platen #2. The switch positions are as follows: Switch 78 is at O; 68 at C; 74 at C; switches 69—72 and switches 73 and 75—77 at O; 80 at C; 79 at O; 57 at O; 58—62 and 63—67 at C; 56 at O; 55 at C; 51 at O; 52 at C; 54 at O; 90, 91 and 92 at O, and 93 at C.

When the timing period is over, switch 93 goes from C to O. Timer reset motor 94 runs and when the neutral position of the time cam is reached switches 92, 91 and 90 go to C. When switch 90 goes to C it deenergizes magnetic air valve 89, the press opens, switch 91 at position C completes the circuit to relay 81; and provided the operator has pushed or pressed button 82 which energized relay 81, the circuit is completed to switch 52. When the press is wide open 52 goes to O position thus continuing the circuit to switch 78 and from here over its O position to switch 68 and from thence over its C position to switch 58 and from thence over its C position to the elevator motor 7 raising the table 4. When the table 4 reaches the level of platen #1 switch 58 goes from C to O position thus connecting the switch 55 and over its C position to the loading motor 30. When the mold platen 20 is fully inserted switch 55 goes to O position thus energizing relay 83 which in turn energizes relay 84 completing the circuit from O position of switch 55 to switch 74 which is at its C position, and from thence to switch 64 over its C position to the elevator motor 7 which now raises the table 4 to platen #2. As this position is reached switch 64 goes to O position energizing relay 97 which now remains energized until switch 78 goes from O to C. Relay 97 in turn energizes relay 99 which completes the circuit over switch 56 (at C) to the unloading motor. Thus the unloading motor and the sequence motor 98 run until switch 78 goes from O to C. This denergizes the relays 97 and 99 and the unloading motor then runs over switch 78 at C. When the mold platen 20 is fully withdrawn, switch 56 goes to O energizing relay 88 which starts the timer reset motor to turn thus operating switches 92, 91 and 90. Switch 90 goes to O energizing magnetic air valve 89 which closes the press. Switch 91 goes to O breaking the previously described circuit thus establishing a circuit to switch 51. When the press is fully closed switch 51 goes to O thus starting the timer motor, also connecting to switch 79 which is at C position thus energizing the relay 97 which starts the sequence motor to turn the sequence cam shaft until switch 79 goes from C to O. When the sequence motor runs to move switch 79 from C position to O position it momentarily breaks switch 80 deenergizing relay 81. It repositions switch 78 from its C to its O position. Switches 68 and 74 are moved from C to O and the next step is selected by moving switches 69 and 75 from O to C. When the timer has moved from the neutral to the zero position, the reset motor switch 93 moves to C where it remains until the timing period is finished.

Going back to the position where, after the mold platen 20 was withdrawn, switch 56 moved to C which started the timer, such movement also energized relay 86 which in turn energized relay 87, which is held in by the circuit from line 105 over switch 57 which is at C position. The closed relay 87 starts the elevator motor 7, lowering the loading table 4. When it reaches switch 57 said switch goes from C to O which deenergizes relay 87 which stops the elevator motor 7 and holds the loading table 4 at this position.

At the end of the new timing period the same procedure and operation occurs as before except that the table runs to the new loading and unloading position #2 and #3, as fixed by switches 69 and 75. The steps 3—4 and 4—5 operate the same way.

When we come to the position where 5 is to be loaded and 1 unloaded the procedure is slightly different. When the timer is reset to its neutral position, thus opening the press, it establishes the circuit through switch 78 to switch 72 through relay 84, to switch 62. Since switch 62 is at its C position, the elevation motor 7 raises the loading table 4. When #5 platen position has been reached, switch 62 goes to O and the gripper arm carriage pushes the mold platen forwardly towards the press, and when the mold platen is fully inserted in the press, switch 55 goes to O, energizing relays 83 and 84. Relay 84 now switches circuit from switch 62 to switch 73. The circuit now runs from the O position of switch 78 through switch 72 through relay 84 through switch 73 to switch 63 and to the elevator motor 7 which lowers the table 4 until switch 63 from O to C. The relays 83 and 84 are energized until switch 78 changes its position from O to C. When switch 63 throws from O to C, relay 97 is energized which in turn energizes relay 99 which completes the circuit over switch 56 (at C) to the unloading motor 7. The unloading motor and the sequence motor 98 start simultaneously. The sequence motor 98 runs until switch 78 goes from O to C, this de-energizes the relays 97 and 99 and the unloading motor then runs over switch 78 at C. The table withdraws the mold platen until switch 56 throws from C to O. This starts the timer, closes the press, repositions the sequence shaft to new selection to load #1 and unload #2, also the loading table 4 lowers to the filling level.

Closing the press over the weekend can be easily accomplished in the following manner. The operator begins to end up by not filling the molds after mold #1 is withdrawn and emptied. After the proper curing time the empty mold is put into the press and the full mold 2 withdrawn. The operator just follows the regular procedure except he does not fill the molds. When the empty mold #5 is to be inserted the operator stands at the main switch for the instruments and as soon as the mold is inserted and the table begins to lower, he pulls the main switch. To start up again Monday morning, all the operator has to do is to open the press manually, throw in the main switch for the controllers and push button 82. The table will now rise to #5 from platen #1, close the press and continue like the regular run. The operator now loads mold #1 and the subsequent empty molds exactly the same as during the normal run.

*In operation*

The following is a description of the operation of my novel machine in use:

We assume that all the spaces between press platens F has a mold in position except the bottom one, the mold which was in the bottom or lowest level has been withdrawn by the gripper arms 39, and is in position on the work table 4 of the carriage before the operator at the proper and convenient working height. The press is then closed.

The operator opens the molds on table 4, first lifting the top hinged parts 23 (Fig. 6) and resting the upper ends against the bar 27 supported by the pivoted supports 28. He then removes the vulcanized soles *x* from the cavities in the middle section of the molds 22.

The operator next swings the bar 24 supported by the shorter arms 25 into position in front of the upright cover pieces 23 and up-ends the middle sections 22 against the bar 24 and removes the vulcanized soles *x* from the bottom plates 21. He next sprays the mold cavities with a solution in general use, and refills the bottom sections 21 with uncured blanks.

A short pull of bar 24 topples the middle plates 22 forward. They fall into position on the bottom plates 21 and expose the cavities on their top surfaces. The operator sprays and fills as described and completes closing of the molds by a short pull on the rod 27.

The mold plates are arranged with two rows of molds having their hinged ends adjacent the center of the table 4. The operations described complete the preparation of one side of the assembly, whereupon the operator steps to the opposite side of the table 4 and repeats the operation as described.

The complete mold on platen 20 is now ready for the press. The press opens automatically at the expiration of the predetermined curing time, and the operator presses the button 89 when he has completed the unloading and loading of the molds and is ready to further proceed. Operating the button 89 sets up the circuits which cause the work table 4 to move upwardly and the rest of the machine to function through one cycle of operation. The gripper arms 39 in the closed position on the gripper lug 20a push the mold 20 into position in the bottom opening of the press. The gripper arms 39 then open, and the carriage 4 moves upwardly opposite to the next mold in the press and stops. The arms 39 then close, and engage the lug 20a on the mold plate, and withdraw the mold platen from the press, into position on the table 4 of the carriage. The carriage 4 with the mold in position lowers, returning to the bottom or working position, and the press then closes.

This cycle of operation is repeated automatically, the carriage moving upwardly serving each level of the press, one after the other, and returning each time to the working level until when the topmost level has been served the carriage automatically begins again at the bottom. Obviously this order could be reversed if desired.

According to my invention, the press opens before the carriage 4 moves, and does not close until the carriage has returned and stopped at its working level. This is a safeguard against the possibility of attempting to insert or withdraw a mold from a closed press or against possibility of closing on a partially inserted or withdrawn mold. Moreover, after the carriage 4 has returned to working position and the press is closed, no part of the machine or press can move or function in any way until the operator has pressed the ready-to-go-button 89. This is a safeguard for the operator as well as for the mechanism, the operator is not "tied" to a timed machine, and the arrangement permits time to remove or replace mold units or take care of any interruptions which might take place.

My machine contains features of great advantage and are novel by providing an arrangement whereby the operator's work table automatically inserts a raw prepared mold in the proper space in a press, automatically moves to the next mold, withdraws a vulcanized mold from the press and presents it to the operator at proper working level, the operation progressively repeating the cycle and bringing the molds to and taking them away from the operator and disposing them in the press in their proper order; also providing a novel construction and design of the mold plate 20 provided with the specially designed lug 20a to be engaged by the gripper arms; also providing a novel swinging bar rest 27 and auxiliary swinging bar rest 27, by the use of which the operator can close simultaneously all of the center plates of the molds and in the same way all of the top plates thereof with a single short movement of each bar; also providing a novel method of operation wherein the workman is entirely relieved of the labor and effort of moving the heavy, hot molds, since he is only required to lift the hinged pieces of the molds, remove cured soles, reload with uncured blanks, and close the molds as above described. In actual practice he is not required to wear protective gloves as is necessary in hand operation.

The operator has no duties, obligations or responsibilities other than to open the molds, remove cured soles, refill mold cavities with uncured blanks, close the molds and then operate the ready-to-go button 89.

Two important objects of my invention are to greatly reduce manual labor, and to produce an increased output of properly cured soles, as compared with any method or system now in use.

A distinct and proven advantage is a greatly increased output per man and per unit, meaning press and sets of molds. Manipulating the molds by power is much faster than is possible by hand; and inasmuch as the operator's entire time is utilized in only loading and unloading the molds, I have shortened the length of the cure, as the molds are out of the press and returned in shorter time, and heat losses from radiation while molds are out are lessened. Capital investment in presses and molds is high; consequently the higher the output per mold in a given time the greater the returns on an investment. In actual practice over a period of several months, operators using my conveyor are averaging an output ratio of 16 to 9 as compared with operators equipped with the usual hydraulically powered manually controlled elevating tables.

After the worker has operated the ready-to-go button 89, the newly filled mold is automatically inserted in the press, the next mold is withdrawn and brought to working level, whereupon the press automatically closes and remains closed for the duration of the predetermined curing period and then at the expiration of this period automatically opens and so stops the cure. This is an important feature, the curing or vulcanizing of any given formula of rubber compounded is an exact science and any "over" or "under" cure results in spoilage of the product.

With my invention it is impossible to spoil the work or product, the curing period is automatically and accurately governed and controlled by the timing device and it should be understood the press opens and so terminates the cure even though no attendant is present. The press does not close again and resume operation until the ready-to-go button has been pressed, and hence the human element does not enter in any way into the length or duration of the curing period, and no work can be spoiled on that account.

I do not limit my invention to the exact form shown in the drawings, for obviously changes may be made therein within the scope of the claims.

I claim.

1. An automatic shoe sole mold selector conveyor, for vulcanizing presses having multiple heated platens uniformly separably disposed between movable heads to provide "closed" and "open" press conditions, comprising a work table vertically movably mounted adjacent the press; means for raising and lowering the work table to and from a loading position; a mold plate on the work table having at its end remote from the press an extension, said plate being adapted to carry a multiplicity of molds having upwardly hinged covers; a carriage reciprocable in said work table; opposed gripper arms on the carriage having teeth adapted when the arms are closed to engage notches in the said extension; means to normally maintain the arms engaged with the extensions and when the carriage reaches the end of the table adjacent the press to open the arms and disengage the extension; means for reciprocating the carriage; and an electric circuit for automatically controlling the work table raising and lowering means and the carriage reciprocating means, said circuit including a source of electric current and devices whereby when the press is "open" the circuit is closed, said devices shifting the work table from loading position to a sequential position opposite one of the press platens, then shifting the carriage to push the mold plate thereon into said platen, then shifting the working table opposite another press platen in prearranged sequential order, then retracting the carriage to load thereon the related mold plate from the last named platen, then returning the work table to loading position, and then closing the press.

2. In a selector conveyor as set forth in claim 1, a bar on the work table above the multiple molds adjacent the hinged ends thereof against which all the mold covers rest when upended; and a pair of arms hinged on the table carrying said bar, whereby a pull on the bar will simultaneously close all the molds.

3. In a selector conveyor as set forth in claim 2, said molds having three hinged sections, and the said bar being adapted to be engaged by the upper sections of the molds when upended; a second bar on the work table adapted to be engaged by the middle sections of the molds when upended; and a second pair of arms hinged on the table and carrying the second bar.

4. In a selector conveyor as set forth in claim 1, spaced aligned pairs of pins on the mold plate adjacent opposite sides thereof engaging corresponding recesses in the molds to maintain the molds in spaced relation thereon.

5. In a selector conveyor as set forth in claim 1, said means for raising and lowering the work table comprising an electric reversible motor in said circuit mounted above said work table; a countershaft; speed reduction means connecting the motor shaft and countershaft; sprockets on the counter shaft; chains secured to the work table and running over said sprockets; and a counterweight cooperation with said chains for balancing the weight of the work table.

6. In a selector conveyor as set forth in claim 1, said carriage reciprocating means comprising and electric reversible motor on the underside of the table connected in said circuit; a drive shaft carrying sprocket wheels; speed reducing means connecting the motor shaft and drive shaft; endless chains running under the said sprockets and having their upper runs disposed below the carriage, said runs extending the full length of the work table and simultaneously running at the same speed and in the same direction; and teeth on the underside of the carriage conforming with the chain formula and extending down into the links of the chains.

7. In a selector conveyor as set forth in claim 1, said work table having grooves in its upper face at each side of the carriage respectively, said grooves extending parallel with the path of travel of the carriage from the end of the work table remote from the press to a point adjacent the press at which point the grooves diverge outwardly of the carriage; and said means for operating the gripper arms comprising members on the gripper arms engaging said grooves respectively.

8. An automatic shoe sole mold selector conveyor, for vulcanizing presses having multiple heated platens uniformly separably disposed between movable heads to provide "closed" and "open" press conditions, comprising a work table vertically movably mounted adjacent the press; means for raising and lowering the work table to and from a loading position; a mold plate on the work table having at its end remote from the press an extension; said plate being adapted to carry a multiplicity of molds having upwardly hinged covers; said work table having a recess extending throughout the length thereof; a carriage reciprocable in said recess; opposed gripper arms pivoted on the carriage at their ends remote from the press and having teeth at their free ends adapted to engage notches in the sides of the said extension; cam means to normally maintain the arms engaged with the extensions and when the carriage reaches the end of the recess adjacent the press to separate the arms to disengage the extension; means for reciprocating the carriage; and an electric circuit for automatically controlling the work table raising and lowering means and the carriage reciprocating means, said circuit including a source of electric current and devices whereby when the press is "open" the circuit is closed, said devices shifting the work table from loading position to a sequential position opposite one of the press platens, then shifting the carriage to push the mold plate thereon onto said platen, then shifting the working table opposite another press platen in prearranged sequential order, then retracting the carriage to load thereon the related mold plate from the last named platen, then returning the work table to its loading position, and then closing the press.

9. In a selector conveyor as set forth in claim 8, a bar on the work table above the multiple molds adjacent the hinged ends thereof against which all the mold covers rest when upended; and a pair of arms hinged on the table carrying said bar, whereby a pull on the bar will simultaneously close all the molds.

10. In a selector conveyor as set forth in claim 9, said molds having three hinged sections, and the said bar being adapted to be engaged by the upper sections of the molds when upended; a second bar on the work table adapted to be engaged by the middle sections of the molds when upended; and a second pair of arms hinged on the table and carrying the second bar.

11. In a selector conveyor as set forth in claim 8, spaced aligned pairs of pins on the mold plate adjacent opposite sides thereof engaging corresponding recesses in the molds to maintain the molds in spaced relation thereon.

12. In a selector conveyor as set forth in claim 8, said means for raising and lowering the work table comprising an electric reversible motor in said circuit mounted above said work table; a countershaft; speed reduction means connecting the motor shaft and countershaft; sprockets on the countershaft; chains secured to the work table and running over said sprockets; and a counterweight cooperating in the said chains for balancing the weight of the work table.

13. In a selector conveyor as set forth in claim 8, said carriage reciprocating means comprising an electric reversible motor on the underside of the table connected in said circuit; a drive shaft carrying sprocket wheels; speed reducing means connecting the motor shaft and drive shaft; endless chains running under the said sprockets and having their upper runs disposed in said work table recess below the carriage, said runs extending the full length of the work table and simultaneously running at the same speed and in the same direction; and teeth on the underside of the carriage conforming with the chain formula and extending down into the links of the chains.

14. In a selector conveyor as set forth in claim 8, said work table having grooves in its upper face at each side of the recess respectively, said grooves extending parallel with the recess from the end of the work table remote from the press adjacent the press at which point the grooves diverge outwardly of the recess; and said means for operating the gripper arms comprising rollers on the arms engaging said grooves respectively.

15. An automatic shoe sole selector conveyor, for vulcanizing presses having multiple heated platens uniformly separably disposed between movable heads to provide "closed" and "open" press conditions comprising a base disposed adjacent the press; vertical guide posts on the base; a fixed head on the posts above the level of the press; a work table movably mounted on the posts; means for raising and lowering the work table; means on the posts for adjusting the work table to loading position in which same is in alignment with the lowermost platen of the press when the latter is "open"; a mold plate on the work table having at its end remote from the press an extension; said plate being adapted to carry a multiplicity of molds having upwardly hinged covers; a carriage reciprocable on said work table; opposed gripper arms on the carriage having teeth adapted when the arms are closed to engage notches in the said extension; means to normally maintain the arms engaged with the extensions and when the carriage reaches the end of the table adjacent the press to open the arms and disengage the extension; means for reciprocating the carriage; and an electric circuit for automatically controlling the work table raising and lowering means and the carriage reciprocating means, said circuit including a source of electric current and devices whereby when the press is "open" to the circuit is closed, said devices shifting the work table from loading position to a sequential position opposite one of the press platens, then shifting the carriage to push the mold plate thereon into the press, then shifting the working table opposite another press platen in prearranged sequential order, then retracting the carriage to load thereon the related mold plate from the last named platen, then returning the work table to its loading position, and then closing the press, whereby the molds on the last named plate may be manually emptied and refilled during the period the press is "closed."

16. In a selector conveyor as set forth in claim 15, said work table having bearing sleeves engaging the posts; a spider connecting the upper ends of the sleeves; a bar above the multiple molds adjacent the hinged ends thereof against which all the mold covers rest when upended; and a pair of arms hinged on the spider carrying said bar, whereby a pull on the bar will simultaneously close all the molds.

17. In a selector conveyor as set forth in claim 16, said molds having three hinged sections, and the said bar being adapted to be engaged by the upper sections of the molds when upended; a second bar adapted to be engaged by the middle sections when upended; and a second pair of arms hinged to the spider and carrying the second bar.

18. In a selector conveyor as set forth in claim 15, said means for raising and lowering the work table comprising an electric reversible motor in said circuit mounted on said fixed head; a countershaft mounted on said fixed head; speed reduction means mounted on said fixed head connecting the motor shaft and countershaft; chain sprockets on the counter shaft; chains secured to the work table and running over said sprockets; and a counterweight mounted on said fixed head cooperating with the chains to balance the weight of the work table.

19. In a selector conveyor as set forth in claim 15, said carriage reciprocating means comprising an electric reversible motor and the underside of the table connected in said circuit; a drive shaft carrying sprocket wheels; speed reducing means connecting the motor shaft and drive shaft; endless chains running under the said sprockets and having their upper runs disposed below the carriage, said runs extending the full length of the work table and simultaneously running at the same speed and in the same direction; and rack teeth on the underside of the carriage conforming with the chain formula and extending down into the links of the chains.

20. In a selector conveyor as set forth in claim 15, said work table having grooves in its upper face at each side of the carriage respectively, said grooves extending parallel with the path of travel of the carriage from the end of the work table remote from the press to a point adjacent the press at which point the grooves diverge outwardly of the carriage; and said means for operating the tripper arms comprising rollers on the arms engaging said grooves respectively.

LEO F. EXLEY.

No references cited.